US006931554B2

(12) United States Patent
Kung (10) Patent No.: US 6,931,554 B2
(45) Date of Patent: Aug. 16, 2005

(54) ADD-ON CARD FOR WIRELESS COMMUNICATION WITH POWER-MANAGING CIRCUIT

(75) Inventor: Shao-Tsu Kung, Taipei (TW)

(73) Assignee: Compal Electronics, Inc., Taipei (TW)

( * ) Notice: Subject to any disclaimer, the term of this patent is extended or adjusted under 35 U.S.C. 154(b) by 610 days.

(21) Appl. No.: 09/683,964

(22) Filed: Mar. 6, 2002

(65) Prior Publication Data

US 2003/0101303 A1 May 29, 2003

(30) Foreign Application Priority Data

Nov. 23, 2001 (TW) ........................................ 90129133 A (51) Int. Cl.[7] .............................................. G06F 1/32
(52) U.S. Cl. .................... 713/320; 713/340; 455/127.1; 455/128; 455/557; 343/703; 343/767; 363/35
(58) Field of Search ................................ 713/300, 320, 713/340; 455/127.1, 127.5, 128, 557, 558; 343/703, 767; 363/35

(56) References Cited

U.S. PATENT DOCUMENTS

| 5,590,419 | A | | 12/1996 | Shimo |
| 5,896,574 | A | | 4/1999 | Bass, Sr. |
| 6,581,837 | B1 | * | 6/2003 | Hattersley .............. 235/462.44 |
| 6,705,520 | B1 | * | 3/2004 | Pitroda et al. ........... 235/382.5 |
| 6,707,867 | B2 | * | 3/2004 | Diepstraten et al. ........ 375/354 |
| 6,745,937 | B2 | * | 6/2004 | Walsh et al. ................ 235/379 |
| 6,762,725 | B2 | * | 7/2004 | Beard et al. ................ 343/702 |

* cited by examiner

*Primary Examiner*—Rehana Perveen
(74) *Attorney, Agent, or Firm*—Winston Hsu (57) ABSTRACT

An add-on card for a personal digital assistant (PDA) for wireless communication includes a connector for connecting to the PDA, a power managing circuit connected to the connector for storing a first current supplied from the connector, and a radio-frequency (RF) circuit for transmitting an RF signal corresponding to a signal from the connector or transmitting a signal to the PDA via the connector according to a received RF signal. The power managing circuit is electrically connected to the RF circuit. When the RF circuit transmits the RF signal, the power managing circuit will provide a second current to the RF circuit.

21 Claims, 6 Drawing Sheets

ADD-ON CARD FOR WIRELESS COMMUNICATION WITH POWER-MANAGING CIRCUIT

BACKGROUND OF INVENTION

1. Field of the Invention

The present invention relates to an add-on card for wireless communication with a personal digital assistant (PDA), and more particularly, to an add-on card for wireless communication with a power-managing circuit for managing the power supplied.

2. Description of the Prior Art

Modern electrical technological advancements have vastly decreased the size of a personal computer. Some portable computers are light enough and small enough to be put in a pocket. They are called pocket or palm-sized computers, such as the personal digital assistant (PDA).

The expansion, or add-on card, is a card which contains electronic devices and is inserted in a socket formed in such a portable personal computer in order to improve its performance or functionality. Recently, the relative socket and the expansion cards have been widely standardized. The socket of the PDA has to provide the current needed by the circuitry of the add-on card for the card to work properly.

With the increasing popularity of PDAs, there has been a similar increase into researching various functioned add-on cards to improve the PDAs performance. If every add-on card is suitable for the standard socket, the PDA can be relatively low cost and convenient to expand functionality. However, because the power supplied from the standard socket of the CF card is limited, it limits the add-on cards functionality. The highest current supplied from the standard socket of the PDA is about 550 milliampere (1 milliampere= $\frac{1}{1000}$ ampere). If the add-on card needs more current to operate normally than the specification of the standard socket of the PDA provides, the PDA cannot utilize this add-on card to improve its functionality. For example, a desired transient current of an RF circuit for transmitting or receiving the RF signal operating in wireless communication is about 2000 milliampere. Therefore, the RF circuit cannot be located in the add-on card due to the insufficient current of the socket, and the PDA cannot be improved in the field of the wireless communication by using the standard socket of the CF card.

SUMMARY OF INVENTION

It is therefore a primary objective of the claimed invention to provide an add-on card for wireless communication with a power-managing circuit, which improves a PDAs functionality in wireless communication by storing current supplied from the socket of the add-on card and then discharging the stored power timely to supply a larger desired transient current for the add-on card, thus circumventing the insufficient current supplied from the socket.

According to the claimed invention, the add-on card for wireless communication comprises a rectangular housing having an opening formed on an upper side of the rectangular housing, an interface connector located in the opening of the rectangular housing for connecting to a PDA, a power-managing circuit electrically connected to the interface connector for storing power of a first direct current (DC) supplied from the interface connector, and a radio-frequency (RF) circuit enclosed in the rectangular housing and electrically connected to the interface connector for transmitting a RF signal corresponding to an electrical signal from the interface connector or transmitting an electrical signal to the PDA via the interface connector according to a received RF signal. The power-managing circuit is electrically connected to the RF circuit, and when the RF circuit transmits the RF signal, the power-managing circuit provides a second DC to the RF circuit.

The add-on card in the claimed invention includes the power-managing circuit to adjust the desired power of the RF circuit, so the power can be stored in the power-storage unit when the RF circuit operates in the low power consumption mode and can be discharged to support the higher desired current when the RF circuit operates in the high power consumption mode.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
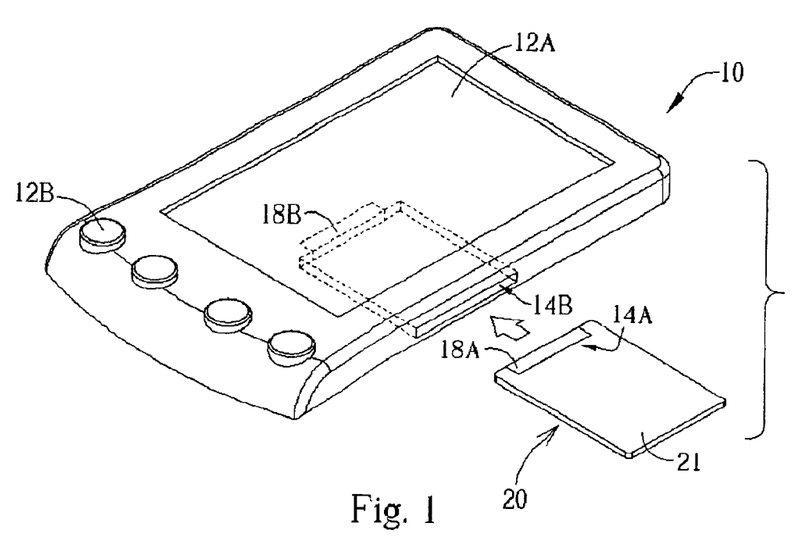
FIG. 1 is a schematic diagram of an add-on card for wireless communication for use in a PDA according to the present invention.

Please refer to FIG. 1. FIG. 1 is a schematic diagram of an add-on card for wireless communication 20 for use in a PDA 10 according to the present invention. The PDA 10 includes a touch screen 12A for displaying pictures and accepting input by touch, and a plurality of buttons 12B formed on the PDA 10. The users can touch the touch screen 12A and the buttons 12B to operate the PDA 10. In order to match the add-on card 20, the PDA 10 further includes an opening 14B comprising an expansion socket 18B located in the insert opening 14B. The add-on card 20 in the present invention, is covered with a rectangular housing 21 having an opening 14A formed on an upper side of the rectangular housing 21, and an interface connector 18A corresponding to the expansion socket 18B located in the opening 14A. When the add-on card 20 is inserted into the opening 14B of the PDA 10, the interface connector 18A will be connected to the expansion socket 18B.

Figure 2:
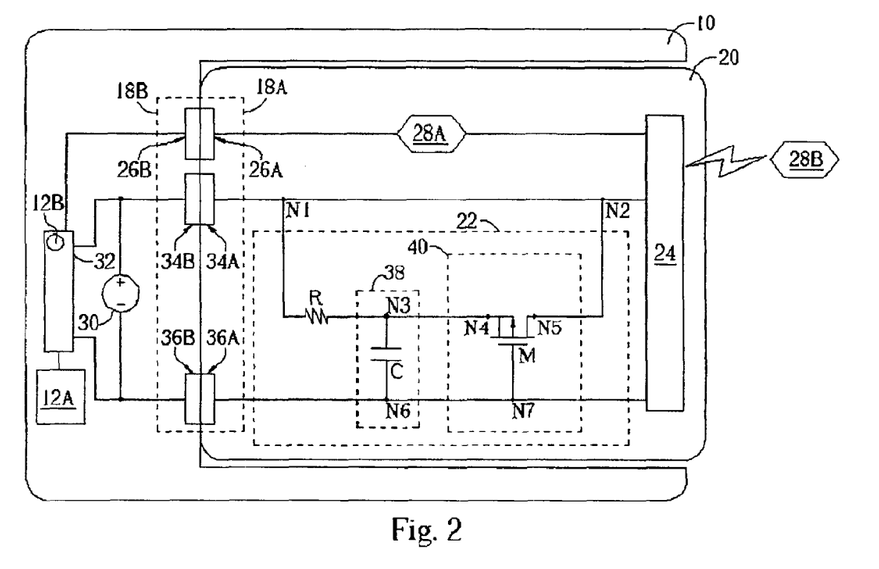
FIG. 2 is a function block diagram of the add-on card shown in FIG. 1.

Please refer to FIG. 2. FIG. 2 is a function block diagram of the add-on 20 connected to the PDA 10. A processing circuit 32 is located in the PDA 10 for controlling the PDA 10, such as storing information, executing programs and processing data, etc. The touch screen 12A for displaying pictures and the buttons 12B are electrically connected to the processing circuit 32, and the users can touch the touch screen 12A and the buttons 12B to operate the processing circuit 32 of the PDA 10. In addition, the PDA 10 has a battery 30 for supplying desired power for operating the PDA 10. In order to connect to the add-on card, a data terminal 26B for transmitting an electrical signal, a power terminal 34B, and a ground terminal 36B for transmitting a direct current (DC) power are located in the expansion socket 18B of the PDA 10.

The add-on card 20, having a radio-frequency (RF) circuit 24 enclosed in the rectangular housing 21 for transmitting and receiving a RF signal, is used to increase the functionality of the PDA 10 in the present invention. The interface connector 18A of the add-on card 20 has a data terminal 26A, a DC power terminal 34A and a ground terminal 36A corresponding to the data terminal 26B, the power terminal 34B, and the ground terminal 36A of the expansion socket 18B, respectively. When the expansion socket 18B is connected to the interface connector 18A, the data terminal 26A and the data terminal 26B, the power terminal 34B and the DC power terminal 34A, and the ground terminal 36A and the ground terminal 36B are electrically connected with each other, respectively. Therefore, the processing circuit 32 can exchange the electrical signal with the RF circuit 24 via the data terminals 26A and 26B, the power supplied from the battery 30 can be transmitted to the add-on card 20 via the DC power terminals 34A and 34B, and the ground terminals 36A and 36B.

The operating method of the add-on card 20 is described below. When the users utilize wireless communication using the PDA 10, the processing circuit 32 transmits an electrical signal 28A to the RF circuit 24 of the add-on card 20 via the data terminals 26A and 26B. The RF circuit 24 transmits a RF signal 28B corresponding to the electrical signal 28A in a wireless manner. On the other hand, when the add-on card 20 receives a RF signal 28B, the RF circuit 24 generates the electrical signal 28A, according to the received RF signal 28B, to the processing circuit 32 via the data terminals 26A and 26B. The RF circuit 24 of the add-on card 20 transmits, receives, and processes the RF signal so as to expand the wireless communication functionality of the PDA 10.

Figure 3:
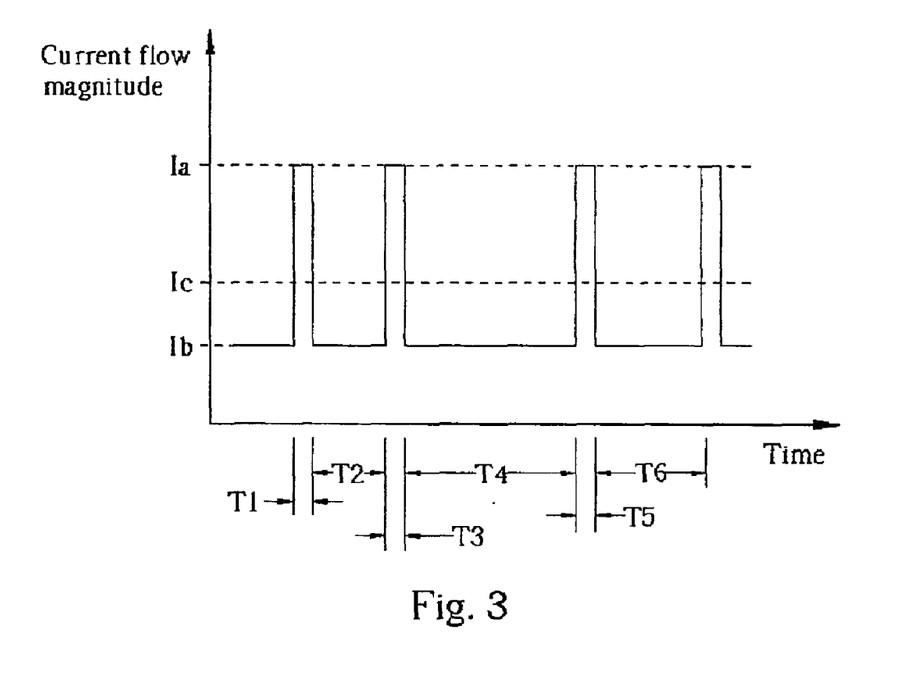
FIG. 3 is a schematic diagram illustrating current flow magnitude variations of the add-on card shown in FIG. 1.

Please refer to FIG. 3. FIG. 3 is a schematic diagram illustrating desired current flow magnitude variations of the RF circuit 24 while it operates in various modes. The transverse axis in FIG. 3 is time and the vertical axis is a current flow magnitude. The RF circuit 24 is the principal operating circuit when the add-on card 20 is used for wireless communication. In order to operate the RF circuit 24 normally, the desired power of the RF circuit 24 must be supplied. Because a larger transmission power is needed when the RF circuit 24 transmits the RF signal, the desired current magnitude (power) of the RF circuit 24 is increased. The time periods T1, T3, and T5 shown in FIG. 3 are durations when the RF circuit 24 transmits the RF signal, and the desired current flow magnitude $I_a$ shown in FIG. 3 of the RF circuit 24 is larger in these conditions. On the other hand, when the RF circuit 24 does not transmit the RF signal but receives the RF signal or is in a down time, a lower current flow magnitude $I_b$ shown in FIG. 3 is desired. Time periods T2, T4, and T6 are durations when the RF circuit 24 receives the RF signal or is in a down time. However, the expansion socket 18B of a normal CF card is unable to supply a sufficient current flow magnitude to the RF circuit 24 while the RF circuit 24 transmits the RF signal. The current flow magnitude $I_c$ shown in FIG. 3 is the current flow magnitude that the expansion socket 18B supplies to the RF circuit 24 via the power terminals 34B and 34A. As shown in FIG. 3, although the current flow magnitude $I_c$ supplied from the expansion socket 18B can supply the desired current flow magnitude $I_b$ (time periods T2, T4 and T6) to the RF circuit 24 when the RF circuit 24 receives the RF signal or is in a down time, it is unable to supply the desired current flow magnitude $I_a$ (time periods T1, T3 and T5) when the RF circuit 24 transmits the RF signal. In order to solve this problem, the add-on card 20 further includes a power-managing circuit 22 in the present invention.

Please refer to FIG. 2; the power-managing circuit 22 includes a resistor R electrically connected between a node N1 and a node N3, a power-storage unit 38 and a bypass circuit 40. The power-storage unit 38 is a capacitor C with a large capacitance with the two ends of the capacitor C connected to node N3 and node N6, respectively. The bypass circuit 40 comprises a P-type metal-oxide semiconductor (MOS) transistor M. The source of the transistor M is electrically connected to node N4, forming an input terminal of the bypass circuit 40. The drain of the transistor M is electrically connected to node N5, forming an output terminal of the bypass circuit 40. The gate of the transistor M is electrically connected to node N7. In the power-managing circuit 22, the node N1 is connected to the DC power terminal 34A, the node N2 is connected to the RF circuit 24, the ground terminals 36A and 36B, and the nodes N6 and N7 are electrically connected to the ground terminals of the power-managing circuit 22 and the RF circuit 24.

Figure 4A:
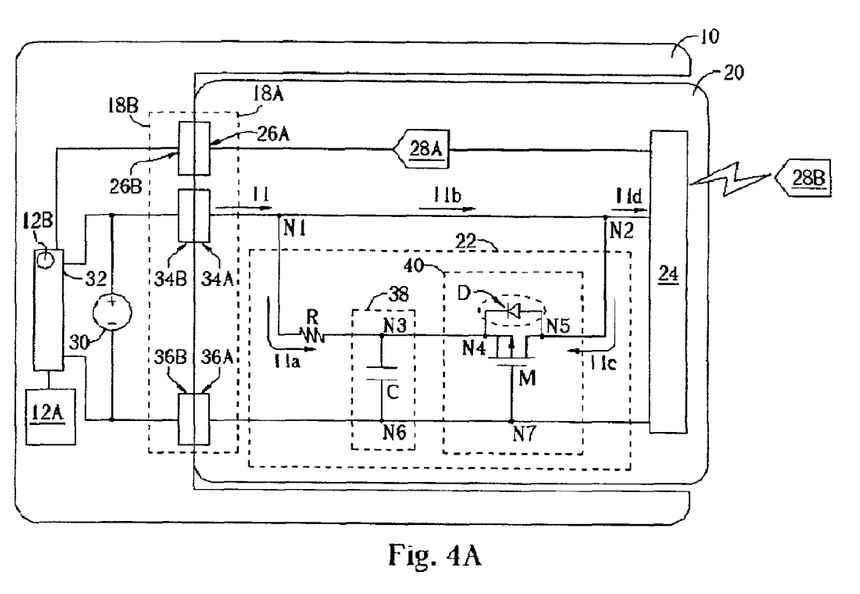
FIG. 4A to FIG. 4C are function block diagrams of the add-on card shown in FIG. 1 when the add-on card operates in various modes.
Figure 4B:
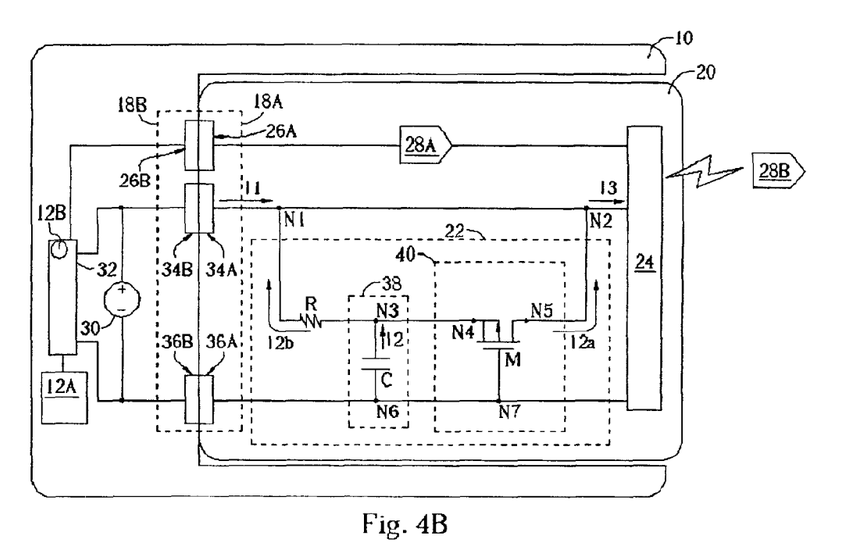
Figure 4C:
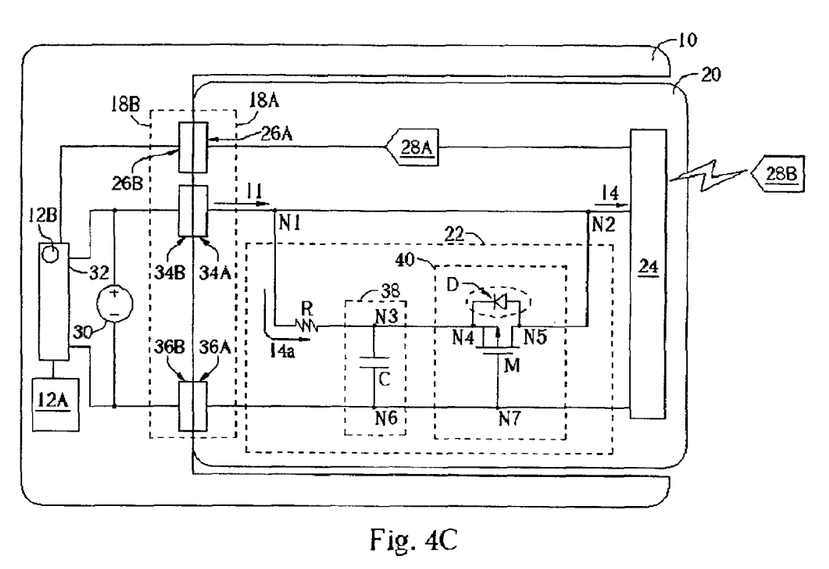

Please refer to FIG. 4A to FIG. 4C. FIG. 4A to FIG. 4C are function block diagrams of the power-managing circuit 22 of the present invention operating in various modes. As shown in FIG. 4A, before the add-on card 20 operates, the power stored in the power-storage unit 38 is probably low, and the voltage of the node N3 is also low. When the add-on card 20 starts to operate, the higher voltage supplied from the DC power terminal 34A charges the lower voltaged node N3. At this time, the PDA 10 provides a first DC I1, as an arrow shown in FIG. 4, flowing through the power terminals 34B and 34A into the add-on card 20. The first DC I1 flows into the two currents $I1_a$ and $I1_c$ at node N1 and node N2, respectively, charging the capacitor C of the power-storage unit 38, and a current $I1_d$ bypassing node N2 flows into the RF circuit 24. The current $I1_a$ flowing from node N1 to node N3 through the resistor R charges the capacitor C of the power-storage unit 38. The resistor R limits the current flow magnitude of the current $I1_a$ to prevent the voltage of node N3, at the beginning of charging, from increasing suddenly to the voltage of node N1, destroying the capacitor C. On the other hand, the voltage difference between node N4 (source) and node N7 (gate) of the transistor M is not large enough to open the transistor M. However, an equivalent diode D formed due to the reserved bias between node N5 and node N4 of the transistor M (between the drain and the source of the transistor M) will be opened because the voltage of node N5 is larger than the voltage of node N3 allowing the current $I1_c$ to flow through the drain and the source of the transistor M into node N3. The current $I1_c$ (together with the current $I1_a$) charges the power-storage unit 38. As the power stored in the power-storage unit 38 increases, the voltage of the node N3 increases gradually, and the magnitude of the currents $I1_a$ and $I1_c$ decrease. When the power-storage unit 38 is saturated, the voltage of the node N3 and the voltage of the node N2 are substantially equivalent, and the current flow magnitudes of the currents $I1_a$ and $I1_c$ decrease substantially to zero. The equivalent diode D will be closed because the voltages of node N5 and node N2 are equivalent simultaneously. However, the voltage difference between the source (node N4) and the gate (node N7, ground terminal) of the transistor M is larger than the threshold voltage of the transistor M and the transistor is opened in a low current mode. During the above-mentioned charging period, the current $I1_d$ bypassed from the current I1 supplies continuously the desired power of the RF circuit 24. When first beginning to operate the add-on card 20, an elementary procedure with low power consumption is necessary, such as receiving relative RF signals. At this moment, the desired current of the RF circuit 24 is low enough that the first DC I1 not only satisfies the desired current of the RF circuit 24 by using the current I1$_d$, but also charges the power-storage unit 38 by using the currents I1$_a$ and I1$_c$. When the add-on card 20 finishes the elementary procedure in the wireless communication, the power of the power-storage unit 38 is charged enough.

Please refer to FIG. 4B. FIG. 4B is a function block diagram of the power-managing circuit 22 of the present invention operating in a high power consumption mode. When the RF circuit 24 operates in the high power consumption mode and starts to transmit the RF signal, the first DC I1 supplied from the DC power terminal 34A is insufficient to supply the desired power of the RF circuit 24, so that the capacitor C of the power-storage unit 38 discharges to provide external current and power to the RF circuit 24. When the RF circuit 24 starts to transmit the RF signal and the desired current is increased suddenly, the voltage of the node N2 decreases slightly because the current flow magnitude of the DC power terminal 34A is insufficient. The voltage of the node N2 (together with the node N1 short-circuited with the node N2) is lower than the voltage of the node N3 after the power-storage unit 38 is charged enough, and the capacitor C of the power-storage unit 38 starts to discharge, generating a second DC I2 (shown in FIG. 4B). The second DC I2 splits into two currents I2$_a$ and I2$_b$ at node N3. The current I2$_a$ flows from node N3 to node N1, and the current I2$_b$ flows from node N3, through node N4 and node N5, into the first DC I1 supplied from the DC power terminal 34A. The transistor M is opened in a high current mode between node N4 (source) and node N5 (gate), and then an equivalent resistance is formed between node N4 and node N5 after the transistor M is opened. The resistance value of the equivalent resistance is lower than that of the resistor R so that the current flow magnitude of the current I2$_a$ is larger than that of the current I2$_b$. Briefly, the current flow magnitude of the total current I3 provided at the node N2 to the RF circuit 24 is a sum of the first DC I1, the current I2$_a$, and the current I2$_b$; namely the sum of the current flow magnitudes of the first DC I1 and the second DC I2. In the present invention, the capacitance C of the power-storage unit 38 is a capacitor with a large capacitance. The charge quantity stored in the capacitor C is a multiplication of its capacitance and voltage. If the voltage of node N3 decreases slightly, appropriate charges will be discharged from the capacitor C to form the sufficient second DC I2. The current I3 provided from the first DC I1 and the second DC I2 are sufficiently suitable for the desired current when the RF circuit 24 transmits the RF signal.

Please refer to FIG. 4C. FIG. 4C is a function block diagram of the power-managing circuit 22 operating in a low power consumption mode. When the RF circuit 24 receives the RF signal or is in a down time, the necessary current for the RF circuit 24 is decreased. As shown in FIG. 3, when the RF circuit 24 receives the RF signal or is in a down time, the desired current is lower than the first DC I1 supplied from the DC power terminal 34A. During this time, the first DC I1 not only satisfies the desired power of the RF circuit 24, but also charges or recharges the power-storage unit 38. Therefore, when the RF circuit 24 switches from high to the low consumption modes, the voltage of the DC power terminal 34A is normally higher than the voltage of the node N3, and the first DC I1 charges the capacitor C and provides the current I4 to the RF circuit 24 keeping the desired current. When the RF circuit 24 operates in the high consumption mode, the voltage of the power-storage unit 38 decreases slightly due to discharge. When the RF circuit 24 switches to the low consumption mode, the first DC I1 provides a current I4$_a$ at the node N4 to recharge the power-storage unit 38. At this moment, the reversed bias equivalent diode D between the source and the drain of the transistor will not open because the voltage difference between node N4 and node N5 is not sufficient, so that the power-storage unit 38 will not receive current via the bypass circuit 40 at node N2. It only will be charged by the current I4$_a$ bypassed from node N4 to prevent the power-storage unit 38 from charging too much from the first DC I1 to affect the normal current supplied from the first DC I1 to the RF circuit 24 in the low consumption mode. As the current I4$_a$ charges continuously, the power of the power-storage unit 38 will be re-supplied so that the voltage of the node N3 increases. When the voltage of the node N3 increases to the voltage of the DC power terminal 34A, the current flow magnitude of the current I4$_a$ decreases to zero. The power of the voltage of node N3 is now saturated. When the RF circuit 24 switches from the low power consumption mode to the high power consumption mode, the power-storage unit 38 provides the second DC to supply the power again, as shown in FIG. 4B.

In summary, when the RF circuit 24 needs more power to transmit the RF signal, the power-managing circuit 22 discharges the power stored in the power-storage unit 38, compensating for the insufficient power supplied from the DC power terminal 34A, so that the RF circuit 24 can operate normally in the high power consumption mode. On the other hand, when the RF circuit 24 operates in the low power consumption, the excess power supplied from the DC power terminal 34A can be stored in the power-storage unit 38 of the power-managing circuit 22 for supplementing the insufficient current of the DC power terminal 34A when the RF circuit 24 operates in the high power consumption mode. For example, when the RF circuit 24 transmits the RF signal and needs more current, about 2 amperes, the RF circuit 24 operates in the high power consumption mode about 0.001 second (i.e. each time period T1, T2 and T3 shown in FIG. 3 is about 0.001 seconds). However, the greatest current flow magnitude of the PDA 10 via the DC power terminal 34A is about 0.5 ampere. In the present invention, the capacitor C of the power-storage unit 38 has a large capacitance, such as 2 faradays. If the voltage of node N3 decreases 0.00075 volts lower than the voltage of node N1, about 1.5 amperes can be provided during the needed 0.001 seconds (i.e. the second DC I2 shown in FIG. 4B). In the present invention, the resistance value of the resistor R is about 0.2 ohm, and a resistance value of the equivalent resistance formed between node N4 and node N5 of the transistor M is about 0.002 ohm, so that a great part of the second DC bypasses to the current I1$_a$ flowing through node N2 to the RF circuit 24. On the other hand, when the RF circuit 24 operates in the low power consumption (i.e. the time periods T2, T4 and T6 shown in FIG. 3), the time period, about 0.01 seconds, is longer. The first DC I1 supplied from the DC power terminal 34A can provide the power to charge the power-storage unit 38 of the power-managing circuit 22 during this time, as shown in FIG. 4. The power-storage unit 38 can also utilize the battery capable of charging to achieve the improvement of the present invention.

In prior art technology, the current supplied from the standard expansion socket of the PDA is insufficient to support the desired current of the RF circuit when the RF circuit operates in the high power consumption mode, so that users can not utilize the simple and low cost add-on card to improve the functionality of the PDA. In contrast to the prior art, the add-on card in the present invention includes a power-managing circuit to adjust the desired power of the RF circuit so the power can be stored when the RF circuit operates in the low power consumption mode and discharged to support the higher desired current of the RF circuit when the RF circuit operates in the high power consumption mode. Therefore, the PDA can utilize the add-on card to expand its functionality in the field of wireless communication. The advantages of the present invention are described as follows. First, the present invention continues using the conventional expansion socket of the CF card. Although the current supplied from the expansion socket is insufficient to support the high power consumption mode of the add-on card, the add-on card in the present invention utilizes the power-managing circuit to adjust the desired power to avoid the problem. This allows users to improve the functionality of the PDA by using this expansion socket without the need for designing new PDAs. In addition, the power-managing circuit re-supplies the power automatically when the RF circuit operates in the low power consumption, and the user does not have to charge the add-on card or change a battery, which is convenient and efficient. The power-managing circuit is not only utilized in the present invention, but also in the add-on card for other functionality.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An add-on card for wireless communication capable of being inserted into a personal digital assistant (PDA) comprising:
   a rectangular housing having an opening formed on an upper side of the rectangular housing;
   an interface connector disposed in the opening of the rectangular housing for connecting to the PDA and comprising a DC power terminal for supplying a first direct current (DC);
   a radio-frequency (RF) circuit enclosed in the rectangular housing, the RF circuit electrically connected to the DC power terminal for receiving the first DC and electrically connected to the interface connector for transmitting an RF signal corresponding to an electrical signal from the interface connector or transmitting an electrical signal to the PDA via the interface connector according to a received RF signal;
   a power-managing circuit electrically connected to the DC power terminal for storing charges supplied by the first DC and electrically connected to the RF circuit for supplying a second DC to the RF circuit; and
   wherein when the RF circuit does not transmit the RF signal, the first DC supplies desired power of the RF circuit and charges the power-managing circuit simultaneously, and when the RF circuit transmits the RF signal, the power-managing circuit provides the second DC to the RF circuit and the first DC and the second DC flow into the RF circuit simultaneously for providing the desired power of the RF circuit.

2. The add-on card for wireless communication of claim 1 wherein a current flow magnitude of the second DC is larger than a current flow magnitude of the first DC supplied from the interface connector.

3. The add-on card for wireless communication of claim 1 wherein the PDA further comprises:
   a battery for supplying power for operating the PDA; and
   a touch screen for displaying pictures and accepting inputs by touch.

4. The add-on card for wireless communication of claim 3 wherein the power of the first DC is supplied by the battery.

5. The add-on card for wireless communication of claim 1 wherein when the RF circuit does not transmit the RF signal, the power-managing circuit stops providing the second DC.

6. The add-on card for wireless communication of claim 1 wherein the power-managing circuit comprises:
   a power-storage unit electrically connected to the DC power terminal for storing the power supplied from the first DC and providing the power to the second DC; and
   a bypass circuit having an input terminal electrically connected to the power-storage unit and an output terminal electrically connected to the DC power terminal and the RF circuit; when the RF circuit does not transmit the RF signal and the first DC supplies the charges, the bypass circuit prevents the current from flowing from the DC power terminal via the output terminal and the input terminal into the power-storage unit, and when the RF circuit transmits the RF signal, the bypass circuit inputs the power supplied from the power-storage unit via the input terminal and outputs the power into the RF circuit via the output terminal.

7. The add-on card for wireless communication of claim 6 wherein the bypass circuit comprises a metal-oxide semiconductor (MOS) transistor, a source of the transistor is electrically connected to the input terminal, and a drain of the transistor is electrically connected to the output terminal; when the RF circuit does not transmit the RF signal, a reverse bias between the source and the drain of the transistor prevents the current from flowing from the DC power terminal via the bypass circuit into the power-storage unit, and when the RF circuit transmits the RF signal, a forward bias between the source and the drain of the transistor transmits the power of the power-storage unit.

8. The add-on card for wireless communication of claim 6 further comprising a resistor electrically connected to the DC power terminal and the power-storage unit preventing too much current flowing into the power-storage unit leaving insufficient current for the RF circuit.

9. The add-on card for wireless communication of claim 6 wherein the power-storage unit is a capacitor.

10. The add-on card for wireless communication of claim 6 wherein the power-storage unit is a rechargeable battery.

11. The add-on card for wireless communication of claim 1 wherein the interface connector conforms to a compact flash (CF) card specification.

12. An add-on card capable of being inserted into a personal digital assistant (PDA) comprising:
   an interface connector capable of being inserted into and pulled out of the PDA;
   a power-managing circuit electrically connected to the interface connector for storing charges supplied by a first direct current (DC) from the interface connector;
   an operating circuit electrically connected to the interface connector for controlling the add-on card wherein the operating circuit is capable of being operated in a high power consumption mode or a low power consumption mode; and
   a DC power terminal electrically connected to the power-managing circuit and the operating circuit for supplying the first DC;
   wherein the power-managing circuit is electrically connected to the operating circuit, and when the operating circuit operates in the high power consumption mode, the power-managing circuit provides a second DC to the operating circuit, and when the operating circuit operates in the low power consumption mode, the power-managing circuit stops providing the second DC;

wherein when the operating circuit operates in a low power consumption mode, the first DC supplies desired power of the operating circuit and charges the power-managing circuit simultaneously, and when the operating circuit operates in a high power consumption mode, the first DC supplied from the DC power terminal of the interface connector and the second DC supplied from the power-managing circuit flow into the operating circuit simultaneously for providing the desired power of the operating circuit.

13. The add-on card of claim 12 wherein a current flow magnitude of the second DC is larger than a current flow magnitude of the first DC supplied from the interface connector.

14. The add-on card of claim 12 wherein the PDA further comprises:

a battery for supplying power for operating the PDA; and a touch screen for displaying pictures and receiving inputs by touch.

15. The add-on card of claim 14 wherein the charges of the first DC are supplied from the battery.

16. The add-on card of claim 12 wherein the power-managing circuit comprises:

a power-storage unit electrically connected to the DC power terminal for storing the power supplied from the first DC and providing the power to the second DC; and a bypass circuit having an input terminal electrically connected to the power-storage unit and an output terminal electrically connected to the DC power terminal and the operating circuit; when the operating circuit operates in a low power consumption mode and the first DC supplies the power, the bypass circuit prevent the current flowing from the DC power terminal via the output terminal and the input terminal into the power-storage unit; and when the operating circuit operates in a high power consumption mode, the bypass circuit inputs the power supplied from the power-storage unit via the input terminal and outputs into the operating circuit via the output terminal.

17. The add-on card of claim 16 wherein the bypass circuit comprises a metal-oxide semiconductor (MOS) transistor, a source of the transistor being electrically connected to the input terminal and a drain of the transistor being electrically connected to the output terminal; when the operating circuit operates in a low power consumption mode, a reverse bias between the source and the drain of the transistor prevents the current from flowing from the DC power terminal via the bypass circuit into the power-storage unit; and when the operating circuit operates in a high power consumption mode, a forward bias between the source and the drain of the transistor transmits the power of the power-storage unit.

18. The add-on card of claim 16 further comprising a resistor electrically connected to the DC power terminal and the power-storage unit preventing too much current flowing into the power-storage unit leaving insufficient current for the RF circuit.

19. The add-on card of claim 16 wherein the power-storage unit is a capacitor.

20. The add-an card of claim 16 wherein the power-storage unit is a rechargeable battery.

21. The add-on card of claim 12 wherein the interface connector conforms to a compact flash (CF) card specification.

* * * * *